July 2, 1946.　　　D. W. VOORHEES　　　2,403,146
WHEEL
Filed Aug. 17, 1942　　　3 Sheets-Sheet 3
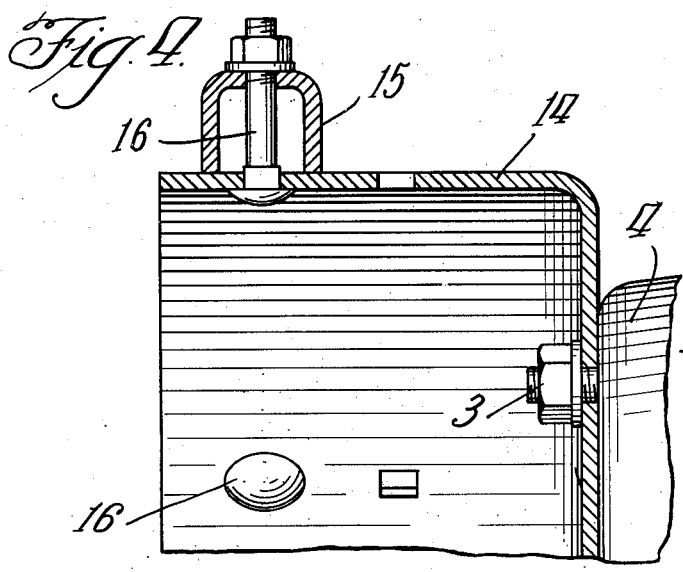
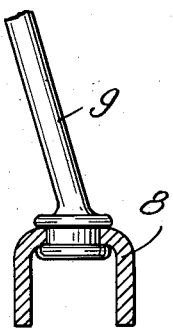
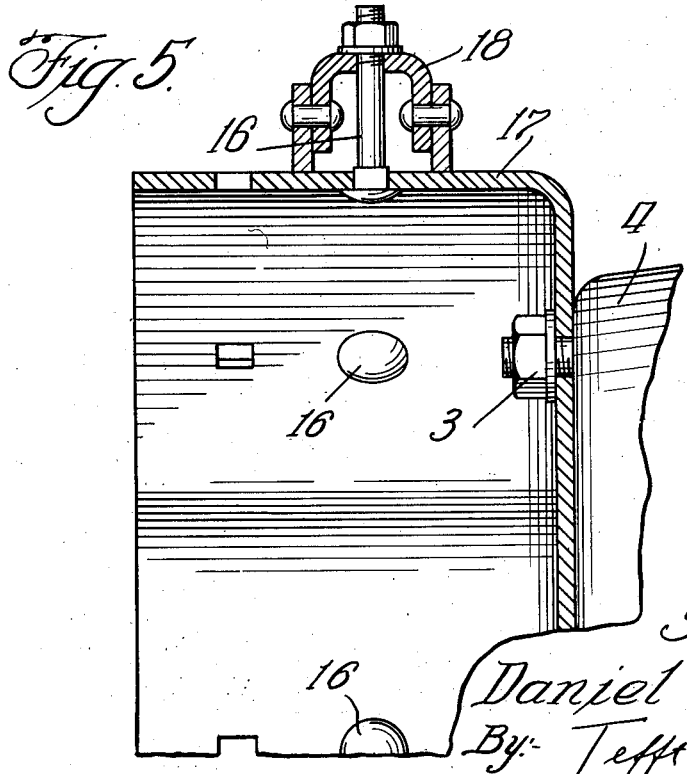
Inventor:
Daniel W. Voorhees
By: Tefft + Tefft, Attys.

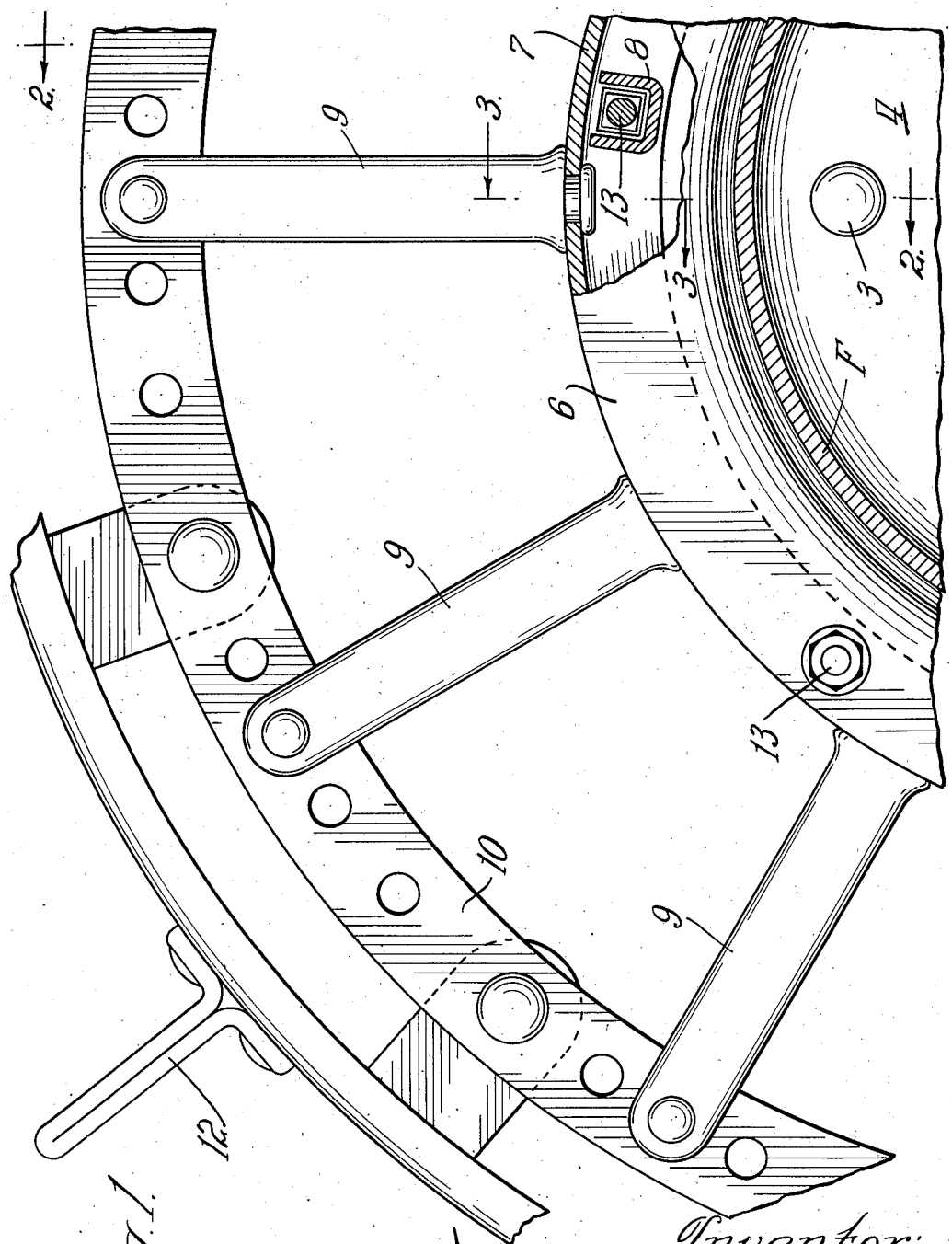

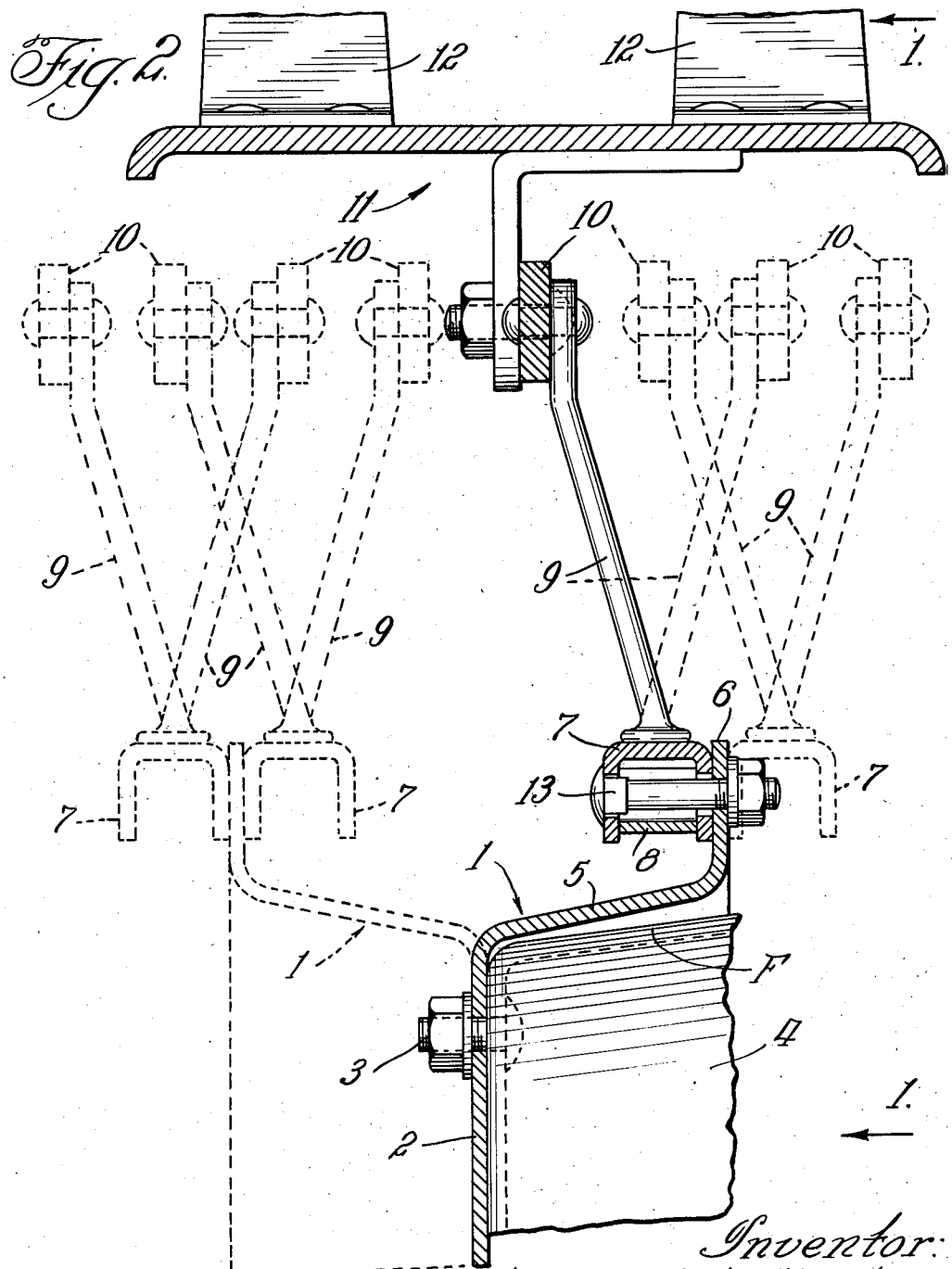

Patented July 2, 1946

2,403,146

UNITED STATES PATENT OFFICE 2,403,146

WHEEL

Daniel W. Voorhees, Quincy, Ill.

Application August 17, 1942, Serial No. 455,044

2 Claims. (Cl. 301—79)

This invention relates to improvements in wheels adapted particularly to be mounted upon the driving hubs of farm tractors, and which are so constructed that the tread of the wheel may be disposed in various positions to vary the spacing apart of the treads of a pair of wheels disposed on opposite ends of the drive shaft or of an axle of the tractor, and wherein said spacing is variable to the extent of a multiple of a predetermined number of inches, as for example, two inches.

Another object of the invention is to provide a composite wheel structure comprising a central or hub portion equipped with means to which a wheel element is removably secured for disposition in predetermined respective spaced apart positions, as aforesaid, and wherein the hub portion of the wheel is detachably secured to the outer end of a shaft or axle of the tractor for positioning in either of two respectively opposite positions thereon.

A further object of the invention is to provide a cheap, durable and efficient wheel structure wherein the wheel element per se, independently of the hub element, may be disposed in positions wherein its inclined spokes may be caused to project in respectively opposite directions angularly to the axis of the wheel to effect variations in the spacing apart of the treads of a pair of said wheels as aforesaid.

Another object of the invention is to provide a structure of the type set forth wherein no parts other than bolts are required for effecting changes in relative positions of the several parts aforesaid.

Other objects and advantages of the invention will be readily understood from or are particularly set forth in the following description.

A suitable embodiment of the invention is illustrated in the accompanying drawings wherein Fig. 1 is a fragmentary side elevation, partly in section, of a wheel constructed in accordance with the invention;

Fig. 2 is a fragmentary radial sectional view of the wheel showing the wheel elements, per se, disposed in one full line position and in dotted line in other positions on the hub portion of the same and showing the portion disposed in two different positions, one thereof in dotted lines, upon the end of a vehicle shaft or the like;

Fig. 3 is a fragmentary detail cross sectional view of the hub portion of the wheel element taken on the line 3—3 of Fig. 1;

Figs. 4 and 5 are fragmentary views similar to Fig. 2, illustrating modified forms of embodiments of the invention.

As shown in Fig. 2, the hub 1 of a wheel constructed in accordance with the invention, and which is composed of a suitable sheet metal, comprises a flat middle portion 2 adapted to be secured by means of bolts 3 to the driver 4 of a tractor shaft or axle or to a similar part of a vehicle of another type. The said hub, which includes the annular flared flange 5 of said middle portion 2, is, in turn, provided with the annular flange 6, the plane of which is vertical.

The angle of the flare of the flange 5 is slightly greater than that of the annular flange F of the driver, so that said hub 1 may be disposed in the reverse of its full line position to the dotted line position of Fig. 2.

The wheel element proper of the structure comprises preferably, the hub portion consisting of a channel bar 7 having its flanges bent inwardly or outwardly if desired and its middle portion or web forming a cylinder. The annular channel so formed is reinforced with opposed arcuate channel bar sections 8 of somewhat less depth than said channel bar 7 and are secured therein by means of welding or the like. Spokes 9 are mounted in the outer cylindrical wall of the hub portion 7 in any suitable manner and carry the rim element 10 composed of circular bar upon which a suitable tread member 11 is mounted. The latter is equipped with cleats 12 for well known reasons.

The inclination of the spokes is such that the vertical flange 10 of the rim is spaced two inches laterally from the hub portion 7, center to center.

The width of the hub portion 7, plus one-half of the thickness of the flange 6, is also two inches, the latter being the standard distance in the art.

The rim 10 is non-detachably secured to the spokes, while the hub portion 7 is detachably secured to the flange 6 by means of carriage bolts 13.

Thus, by mounting the hub portions 7 upon the inner face of the flange 6 with the spokes inclined outwardly, the flange 10 will be disposed two inches inwardly of its full line position.

This spacing is doubled, however, by merely reversing the position of the hub portion 7 on the outer face of the flange 6 so that the spokes become inclined oppositely from their full line position.

To space the flange 10 six inches from its full line position, the hub portion 7 is moved and secured to the inner face of the flange 6 with the spokes inclined to the right. The hub 1 must, of course, be detached from the shaft to effect this change, and then remounted thereon.

To space the flange 10 eight inches from its full line position, the hub 1 with the hub portion 2 mounted thereupon in its last named position, is merely reversed before remounting it upon the shaft.

A spacing of ten inches from last described position is effected by mounting the hub portion 7 upon the right hand face of the flange 6 with the spokes inclined to the left.

Thus the treads of a pair of wheels mounted upon opposite ends of the shaft can be varied in spacing apart anywhere from a minimum of two inches to a maximum of twenty-eight inches, the customary variation being two inches for each of the two wheels or on the basis of a multiple of four inches, this being done to maintain the center of gravity of the vehicle body midway between the wheels.

When the hub 1 is reversed in position, the flange 6 thereof will be spaced eight inches from the position previously occupied, this being four times the width of the hub portions 7 as given above.

Thus the length of the hub 1 from the middle plane of the flange 6 to the middle plane of its end wall, is two times the said width of the hub portion 7 and of the standard spacing apart of the flange 10 as explained above.

The same result may be accomplished without increasing the number and type of parts to be removed and replaced to effect them by substituting for the hub 1 the cylindrical hub 14 of Fig. 4. The inner diameter of the latter is about equal to that of the largest diameter of the middle annular portion 5 of the hub 1 while the inner diameter of the hub portion 15 is equal to the outer diameter of the hub 14 for sliding upon the latter a distance of two inches from an outer to an inner position thereupon, the same being secured to the hub 14 by means of carriage bolts 16 extending radially through the hub 14 and hub portion 15 and disposed in staggered relation to the spokes.

As shown in Fig. 5, the hub 17 may be polygonal in cross section and the hub portion 18 made to fit the same telescopically so that it may be shifted to either of two positions as in the structure of Fig. 4. The advantage of the structure lies in the fact that fewer bolts are required to secure the hub portion 18 to the hub 17.

An advantage of the structures of Figs. 4 and 5 over that of Figs. 1 and 2 lies in the fact that the only times that the hub will need to be detached from the shaft end is when said hub is to be reversed in position.

Other changes in minor details of construction may be made and, if the standard of spacing is changed, as from two inches to three inches, the inclination of the spokes may be changed accordingly. For example, a disk wheel may be substituted for a spoke wheel.

The outstanding advantage of the structure of the invention resides in its extreme simplicity, low cost and the absence of any danger of the loss or misplacing of anything other than a bolt, nut or washer as distinguished from a part that would have to be supplied by the manufacturer.

All parts are made of ductile metal which may be cured of any distortion by equipment usually found on the farm. Such metal rarely breaks and breakages are generally cured easily by welding.

I claim as my invention:

1. In a wheel structure, a spoke connection comprising a hollow ring member of substantially U-shape in cross section, said ring member having a connecting web portion with inturned substantially parallel side flanges, and a plurality of spokes having the inner ends thereof secured to the web portion of the ring member and extending substantially vertically outward therefrom, adapted to be secured to a rim, a hub member, and means for detachably securing said ring member reversibly and interchangeably in different positions relative to the hub member.

2. In a wheel structure, a spoke connection comprising a hollow ring member of substantially U-shape in cross section, said ring member having a connecting web portion with inturned substantially parallel side flanges, and a plurality of spokes having the inner ends thereof secured to the web portion of the ring member and extending substantially vertically outward therefrom adapted to be secured to a rim, a hub member, and means extending through both side flanges for detachably securing said ring member reversibly and interchangeably in different positions relative to the hub member.

DANIEL W. VOORHEES.